(12) United States Patent
Schwemmer

(10) Patent No.: US 6,479,808 B1
(45) Date of Patent: Nov. 12, 2002

(54) METHOD AND SYSTEMS FOR COLLECTING DATA FROM MULTIPLE FIELDS OF VIEW

(75) Inventor: Geary K. Schwemmer, Hampstead, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 308 days.

(21) Appl. No.: 09/605,649

(22) Filed: Jun. 28, 2000

Related U.S. Application Data

(60) Provisional application No. 60/142,527, filed on Jul. 7, 1999.

(51) Int. Cl.[7] ................................................. G02B 7/04

(52) U.S. Cl. ................................. 250/201.5; 250/201.4; 250/208.1

(58) Field of Search .......................... 250/201.5, 201.4, 250/208.1, 216, 201.8

(56) References Cited

U.S. PATENT DOCUMENTS 5,569,904 A  * 10/1996  Meyers .................... 250/201.8

* cited by examiner

*Primary Examiner*—Hung Xuan Dang
(74) *Attorney, Agent, or Firm*—Keith L. Dixon

(57) ABSTRACT

Systems and methods for processing light from multiple fields (48, 54, 55) of view without excessive machinery for scanning optical elements. In an exemplary embodiment of the invention, multiple holographic optical elements (41, 42, 43, 44, 45), integrated on a common film (4), diffract and project light from respective fields of view.

17 Claims, 6 Drawing Sheets

METHOD AND SYSTEMS FOR COLLECTING DATA FROM MULTIPLE FIELDS OF VIEW

CROSS-REFERENCES TO RELATED APPLICATIONS

This Application claims the benefit of application Ser. No. 60/142,527 of Geary Karl Schwemmer filed Jul. 7, 1999 for SHARED APERTURE MULTIPLEXED HOLOGRAPHIC SCANNING TELESCOPE, the contents of which are herein incorporated by reference.

ORIGIN OF THE INVENTION

The invention described herein was made by an employee of the United States Government, and may be manufactured and used by or for the Government for governmental purposes without the payment of royalties thereon or therefor.

BACKGROUND OF THE INVENTION

1. Technical Field

This invention relates generally to optical observations and, more particularly, to methods and systems for collecting data from multiple fields of view.

2. Background Art

Telescopes typically are required to operate through multiple fields of view. This requirement may result from the area of interest being larger than a single field of view of the telescope. For example, in terrain mapping applications, the terrain of interest may be larger then a single field of view of the telescope.

Operating through multiple fields of view may also be desirable in applications, such as wind monitoring, that benefit from multiple viewing angles.

STATEMENT OF THE INVENTION

It is an object of the present invention to provide relatively efficient methods and systems for collecting data from multiple fields of view.

To achieve this and other objects of the present invention, a method comprises receiving light from a first field; responsive to a wavelength received in the previous step, projecting from an optical assembly to a first location; detecting light projected in the previous step; receiving light from a second field; responsive to the wavelength received in the previous step, projecting from the optical assembly; detecting light projected in the previous step; and processing a result of the detecting steps, wherein the optical assembly is stationary relative to the first location.

According to another aspect of the present invention, a system comprises a first projector that projects light received from a first field to a first location; a detector that generates electrical signal responsive to light from the first projector; a second projector that projects light received from a second field; and a processor that receives and processes electrical signals representing light from first and second projectors, wherein the first and second projectors are stationary relative to the detector.

According to yet another aspect of the present invention, a system comprises means for receiving light from a first field; means responsive to a wavelength received by the previous means, for projecting from an optical assembly to a first location; means for detecting light projected by the previous mean s; means for receiving light from a second field; means responsive to the wavelength received in the previous step, for projecting from the optical assembly; means detecting light projected by the previous means; and means for processing signals from the detecting means, wherein the optical assembly is stationary relative to the detecting means.

The accompanying drawings which are incorporated in and which constitute a part of this specification, illustrate embodiments of the invention and, together with the description, explain the principles and advantages of the invention. Throughout the drawings, corresponding parts are labeled with corresponding reference numbers.

DESCRIPTION OF THE PREFERRED EMBODIMENTS

Figure 1:
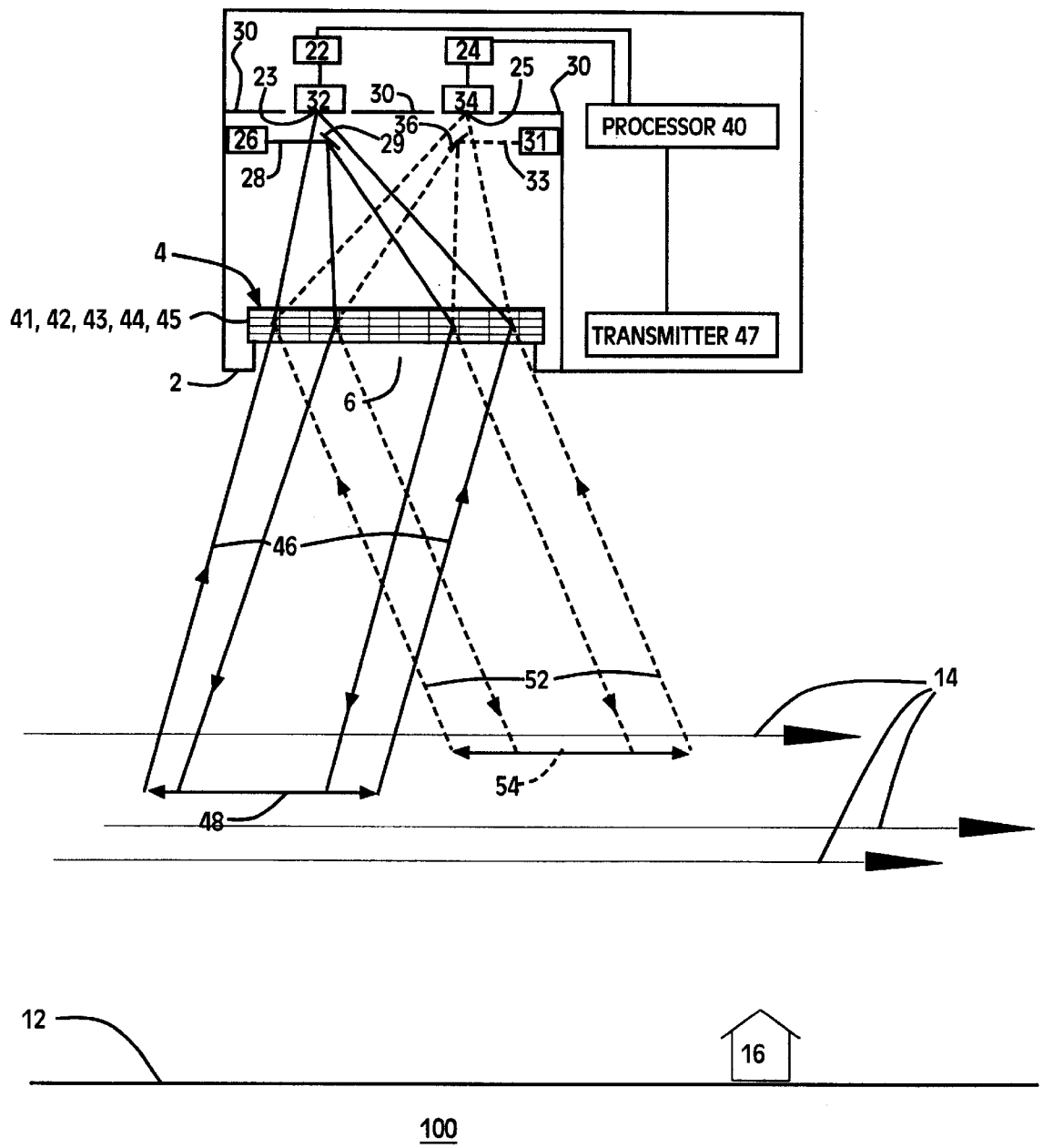
FIG. 1 is a diagram of a satellite having multiple fields of view according to a first preferred embodiment of the invention.

FIG. 1 shows system 100 including satellite 2 in orbit over ground 12 in accordance with a first preferred embodiment of the present invention. Satellite 2 operates in a wind profiling mode by collecting data about winds 14 and transmitting the data to ground station 16 via transmitter 47 on satellite 2.

Satellite 2 includes light box 30 defining an aperture 6 through which light from outside of satellite 2 impinges on holographic unit 4. Satellite 2 includes a transparent glass (not shown) in aperture 6.

Light box 30 also defines 5 other windows through which light may travel from holographic unit 4 to respective light detectors. FIG. 1 shows 2 of the 5 other windows: field stop aperture 23 through which light may travel from holographic unit 4 to focal plane optics 32 to light detector 22; and field stop aperture 25 through which light may travel from holographic unit 4 to focal plane optics 34 to light detector 24.

Holographic unit 4 acts to selectively diffract received light depending on angle and wavelength. Holographic unit 4 transmits the remainder of the received light undiffracted.

Holographic unit 4 includes holographic optical elements (HOEs) 41, 42, 43, 44, and 45. Each of HOEs 41, 42, 43, 44, and 45 is a volume phase hologram having optical focusing power. Each of HOEs 41, 42, 43, 44, and 45 is embedded in a common holographic film by multiple exposure such that each HOE acts on a different set of light rays corresponding to a specific wavelength and angle of incidence. Provided: there is sufficient angular separation between the planes of diffraction of the HOEs, the impact of each HOE on the performance of the others will be acceptable.

All 5 HOEs share the same full physical aperture 6 for the collection of light rays. Each hologram has a moderately wide field-of-view, and acts as a separate telescope looking in its own direction, with its own focus. Thus, holographic unit 4 has an effective wide-field spectral imaging capability.

Processor 40 includes circuitry to determine a wind profile. In this Disclosure, the term circuitry encompasses both dedicated hardware and programmable hardware, such as a CPU or reconfigurable logic array, in combination with programming data, such as sequentially fetched CPU instructions or programming data for a reconfigurable logic array.

Processor 40 includes circuitry to control laser 26, causing laser 26 to emit laser beam 28 towards mirror 29. Laser light reflected from mirror 29 travels to holographic unit 4. Holographic unit 4 diffracts and collimates the light from mirror 29 to illuminate field of view 48.

Laser light 28 back scattered from field of view 48 is depicted by solid lines 46 in FIG. 1. Back scattered laser light 46 travels from field of view 48 to holographic unit 4. Holographic unit 4 diffracts and focuses light 46 through field stop aperture 23, to detector 22 via focal plane optics 32.

Processor 40 includes circuitry to control laser 31, causing laser 31 to emit laser beam 33 towards mirror 36. Laser light reflected from mirror 36 travels to holographic unit 4. Holographic unit 4 diffracts and collimates the light from mirror 36 to illuminate field of view 54.

Laser light 33 back scattered from field of view 54 is depicted by dotted lines 52 in FIG. 1. Back scattered laser light 52 travels from field of view 54 to holographic unit 4. Holographic unit 4 diffracts and focuses light 52 through field stop aperture 25, to detector 24 via focal plane optics 34.

Processor 40 includes circuitry to process the detected signal from detector 22 and the detected signal from detector 24, to send a signal to transmitter 47. Responsive to the signal from processor 40, transmitter 47 sends a signal to ground station 16. Ground station 16 includes circuitry that receives and processes the signal transmitted by transmitter 47.

Figure 2:
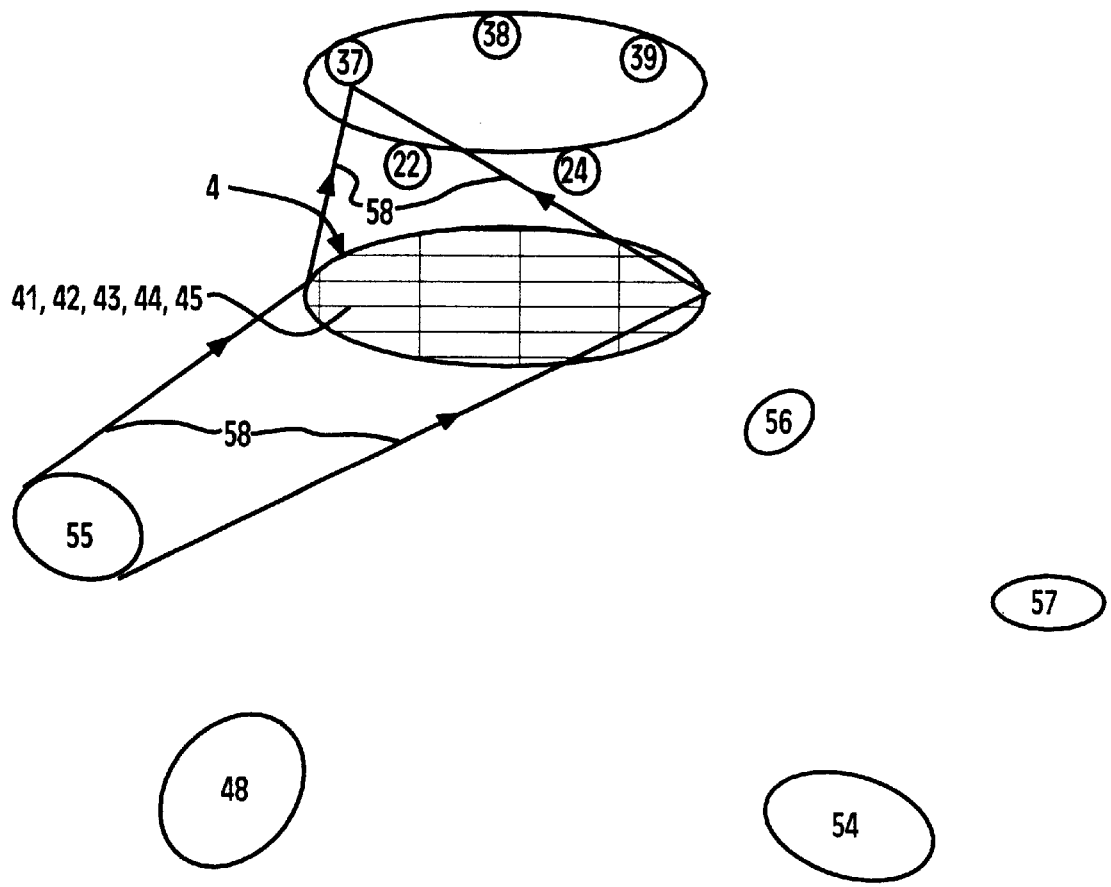
FIG. 2 is a diagram showing another aspect of a satellite and fields of view of FIG. 1.

FIG. 2 emphasizes another aspect of system 100, including field of view 48, field of view 54, field of view 55, field of view 56, and field of view 57. HOE 41 diffracts light from field 48 and focuses the diffracted light toward detector 22. HOE 42 diffracts light from field of view 54 and focuses the diffracted light toward detector 24. HOE 43 diffracts light from field of view 55 and focuses the diffracted light toward detector 37, as shown by rays 58 in FIG. 2. HOE 44 diffracts light from field of view 56 and focuses the diffracted light toward detector 38. HOE 45 diffracts light from field of view 57 and focuses the diffracted light toward detector 39.

In summary, HOE 41 of unit 4 acts to receive light from field 48 and, responsive to a wavelength from field 48, HOE 41 projects to optics 32. Detector 22 detects light from optics 32. HOE 42 acts to receive light from fields 54 and, responsive to wavelength the from field 54, HOE 42 projects to optics 34. Detector 24 detects light form optics 34. Processor 40 includes circuitry to process electrical signals generated by detectors 22 and 24. Holographic unit 4 is stationary relative to optics 32, detector 22, optics 34, and detector 24.

In other words HOE 41 acts as a projector and HOE 42 acts as another projector.

Figure 3:
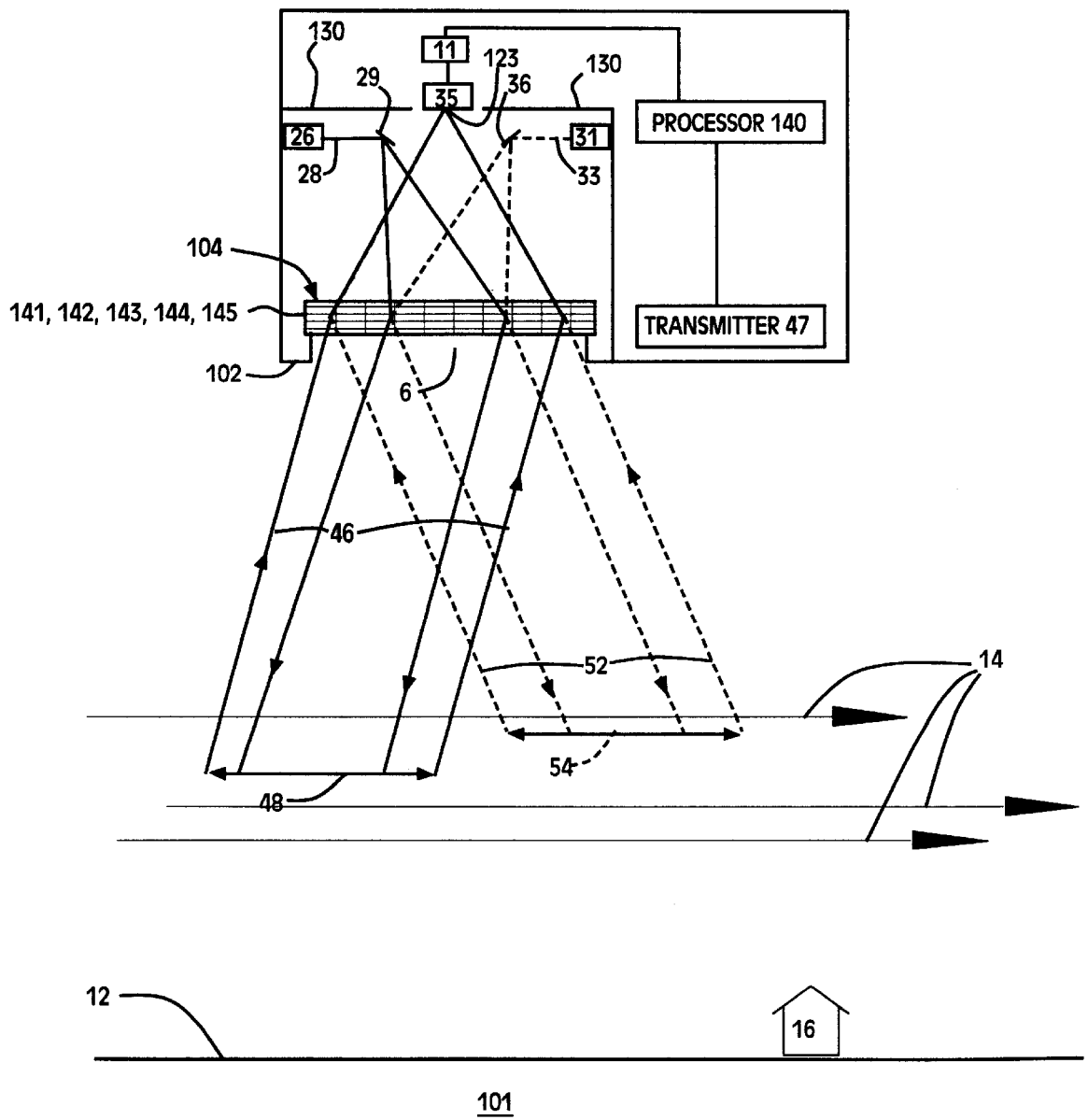
FIG. 3 is a diagram of a satellite having multiple fields of view according to a second preferred embodiment of the invention.

FIG. 3 shows system 101 including satellite 102 in orbit over ground 12 in accordance with a second preferred embodiment of the present invention. Satellite 102 operates in a wind profiling mode by collecting data about winds 14 and transmitting the data to ground station 16 via transmitter 47 on satellite 102.

Satellite 102 includes light box 130 defining an aperture 6 through which light from outside of satellite 102 impinges on holographic unit 104. Satellite 102 includes a transparent glass (not shown) in aperture 6.

Light box 130 also defines field stop aperture 123 through which light may travel from holographic unit 104 to focal plane optics 35 to light detector 11.

Holographic unit 104 acts to selectively diffract received light depending on angle and wavelength. Holographic unit 104 transmits the remainder of the received light through the film undiffracted. Holographic unit 104 includes HOEs 141, 142, 143, 144, and 145. Each of HOEs 141, 142, 143, 144, and 145 is a volume phase hologram having optical focusing power. Each of HOEs 141, 142, 143, 144, and 145 is embedded in a common holographic film by multiple exposure such that each HOE acts on a different set of light rays corresponding to a specific wavelength and angle of incidence.

All 5 holograms share the same full physical aperture 6 for the collection of light rays. Each hologram has a moderately wide field-of-view, and acts as a separate telescope looking in its own direction, with its own focus. Thus, holographic unit 104 has an effective wide-field spectral imaging capability.

Processor 140 includes circuitry to control laser 26, causing laser 26 to emit laser beam 28 towards mirror 29. Laser light reflected from mirror 29 travels to holographic unit 104. Holographic unit 104 diffracts and collimates the light from mirror 29 to illuminate field of view 48.

Laser light 28 back scattered from field of view 48 is depicted by solid lines 46 in FIG. 3. Back scattered laser light 46 travels from field of view 48 to holographic unit 104. Holographic unit 104 diffracts and focuses light 46 through field stop aperture 123, to detector 11 via focal plane optics 35.

Processor 140 includes circuitry to control laser 31, causing laser 31 to emit laser beam 33 towards mirror 36. Laser light reflected from mirror 36 travels to holographic unit 104. Holographic unit 4 diffracts and collimates the light from mirror 36 to illuminate field of view 54.

Laser light 33 back scattered from field of view 54 is depicted by dotted lines 52 in FIG. 3. Back scattered laser light 52 travels from field of view 54 to holographic unit 104. Holographic unit 104 diffracts and focuses light 52 through field stop aperture 123, to detector 11 via focal plane optics 35.

Processor 40 includes circuitry to process the detected signals from detector 11, to send a signal to transmitter 47. Responsive to the signal from processor 140, transmitter 47 sends a signal to ground station 16.

Figure 4:
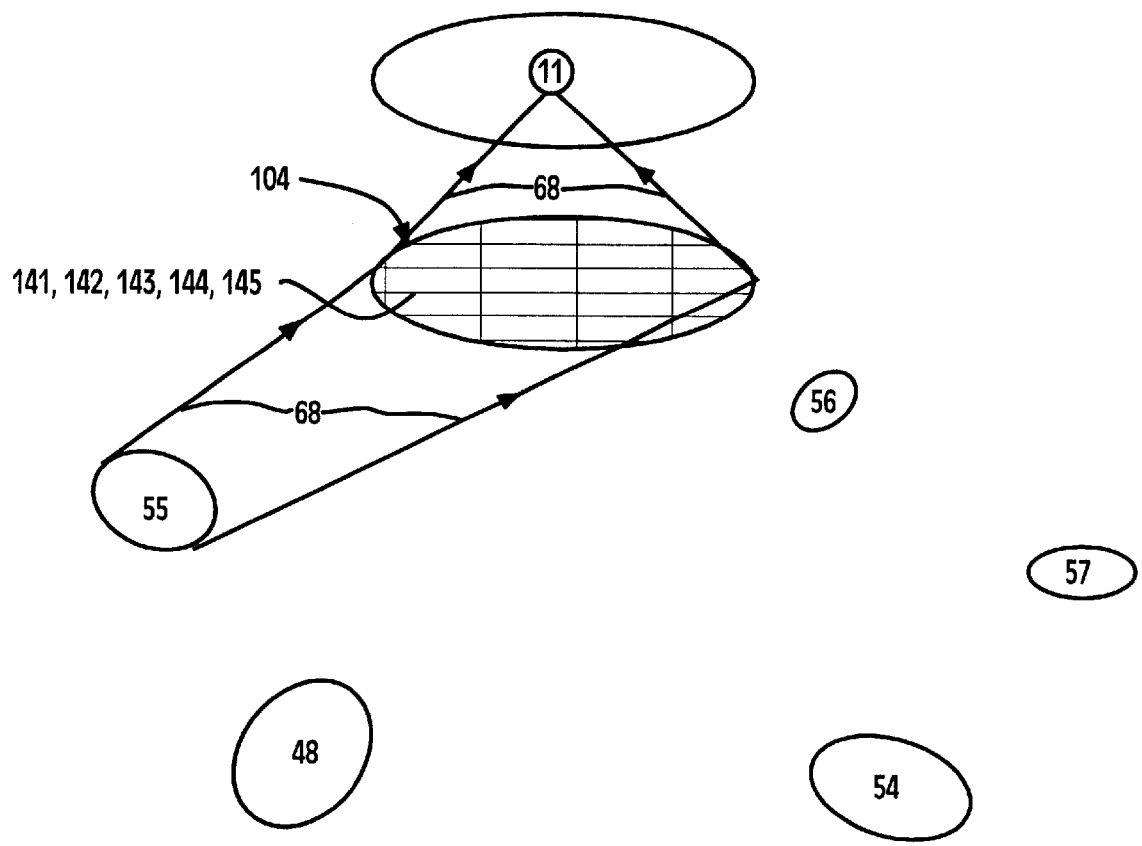
FIG. 4 is a diagram showing another aspect of a satellite and fields of view of FIG. 3.

FIG. 4 emphasizes another aspect of system 101, including field of view 48, field of view 54, field of view 55, field of view 56, and field of view 57. HOE 141 diffracts light from field 48 and focuses the diffracted light toward detector 11. HOE 142 diffracts light from field of view 54 and focuses the diffracted light toward detector 11. HOE 143 diffracts light from field of view 55 and focuses the diffracted light toward detector 11., as shown by rays 68 in FIG. 4. HOE 144 diffracts light from field of view 56 and focuses the diffracted light toward detector 11. HOE 145 diffracts light from field of view 57 and focuses the diffracted light toward detector 11.

Figure 5:
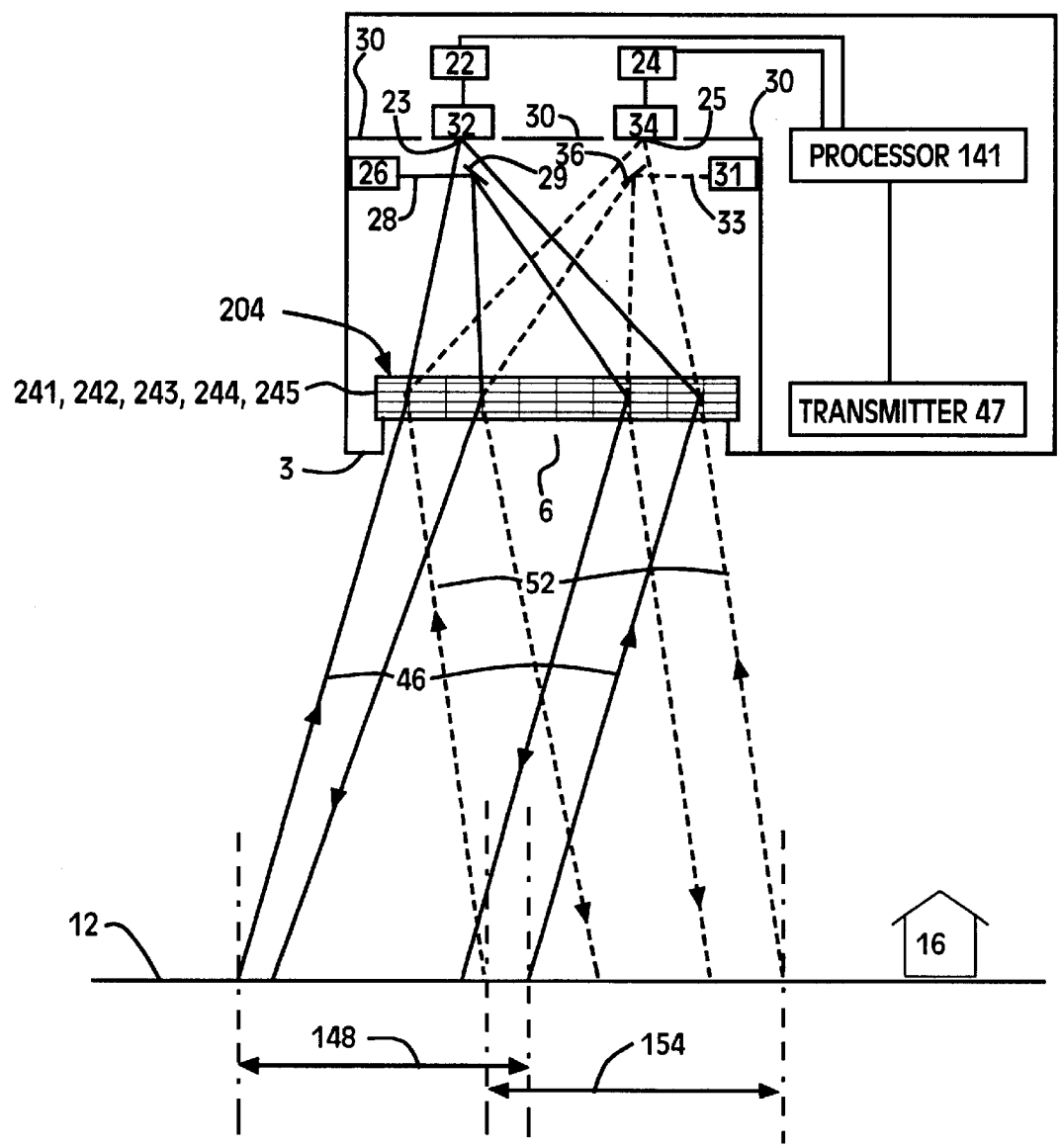
FIG. 5 is a diagram of another satellite having multiple fields of view according to a second preferred embodiment of the invention.

FIG. 5 shows system 103 including satellite 3 operating in a terrain mapping mode, collecting data from multiple ground footprints, in accordance with a third preferred embodiment for the present invention. Processor 141 includes circuitry to control lasers 26 and 31 and collect terrain map data. Points on ground 12 correspond to fixed points in the image planes of holographic unit 204.

Holographic unit 204, in satellite 3, is a 5-exposure holographic element for the 1064 nm fundamental wavelength of the most common altimetry laser, Nd:YAG. Holographic unit 204 includes HOEs 241, 242, 243, 244, and 245. Each of HOEs 241, 242, 243, 244, and 245 is a volume phase hologram having optical focusing power. Each of HOEs 241, 242, 243, 244, and 245 is embedded in a common holographic film by multiple exposure such that each HOE acts on a different set of light rays corresponding to a specific wavelength and angle of incidence. Holographic unit 204 has a diameter of approximately 25–30 cm. Each HOE is configured to image an extended target spanning a field of view of 9.5 degrees wide with at least 1 milliradian resolution over the entire field. A linear array of laser pulses across each field of view maps a 9.5 degree wide swath as the satellite 3 orbits overhead.

The five field of views of the second embodiment are laid out such that the ground-track swaths are contiguous with each other, creating a total 46 degree wide swath with a small amount of overlap between field of views.

Processor 141 includes circuitry to control laser 26, causing laser 26 to emit laser beam 28 towards mirror 29. Laser light reflected from mirror 29 travels to holographic unit 204. Holographic unit 204 diffracts and collimates the light from mirror 29 to illuminate the ground within field of view 148.

Laser light 28 back scattered from the ground within field of view 148 is depicted by solid lines 46 in FIG. 5. Back scattered laser light 46 travels from the ground within field of view 148 to holographic unit 204. Holographic unit 204 diffracts and focuses light 46 through field stop aperture 23, to detector 22 via focal plane optics 32.

Processor 141 includes circuitry to control laser 31, causing laser 31 to emit laser beam 33 towards mirror 36. Laser light reflected from mirror 36 travels to holographic unit 204. Holographic unit 204 diffracts and collimates the light from mirror 36 to illuminate the ground within field of view 154.

Laser light 33 back scattered from the ground within field of view 154 is depicted by dotted lines 52 in FIG. 5. Back scattered laser light 52 travels from the ground within field of view 154 to holographic unit 204. Holographic unit 204 diffracts and focuses light 52 through field stop aperture 25, to detector 24 via focal plane optics 34.

Processor 141 includes circuitry to process the detected signal from detector 22 and the detected signal from detector 24, to send a signal to transmitter 47. Responsive to the signal from processor 141, transmitter 47 sends a signal to ground station 16.

Variations on the basic concept include a single laser steered using acousto-optical Bragg deflectors or other means to consecutively select holographic optical elements, instead of multiple lasers to address the various holographic optical elements.

The relevant holographic optical element performance parameters are efficiency, blur circle, focal ratios, scattered light levels, cross-talk, and background light rejection. Diffraction efficiency requirements may limit the number of holographic optical elements that can be multiplexed, and can be traded for an increased number holographic of optical elements and corresponding field of views.

In other alternate embodiments, the transmitter optics used to introduce the transmitted laser beam into the receiver optic axis can be a separate unit for transmitting only. This could be several single hologram, of the same type of multiplexed hologram as the receiver, or other suitabut the focal spots from which the lasers emanate would be offset from the receiver foci. The receiver foci may now be superimposed if desired, so that a single detector can be used for all of the receivers, provided the transmitted pulses from the various lasers are sufficiently separated in time so as not to cause the lidar return signals to overlap.

Preferred embodiments of the invention allow a smaller aperture size for a given flight altitude and laser size. Alternatively, since the technology is scalable to very large (1 meter) sizes, it allows a smaller laser system for a given aircraft altitude or higher altitudes with corresponding wider swath widths on the ground.

Detectors that convert light signals to electrical signals may be located behind the field stops or may instead be spatially displaced from the field stops and light passing through the field stops could travel to the detectors via fiberoptic cables.

Figure 6:
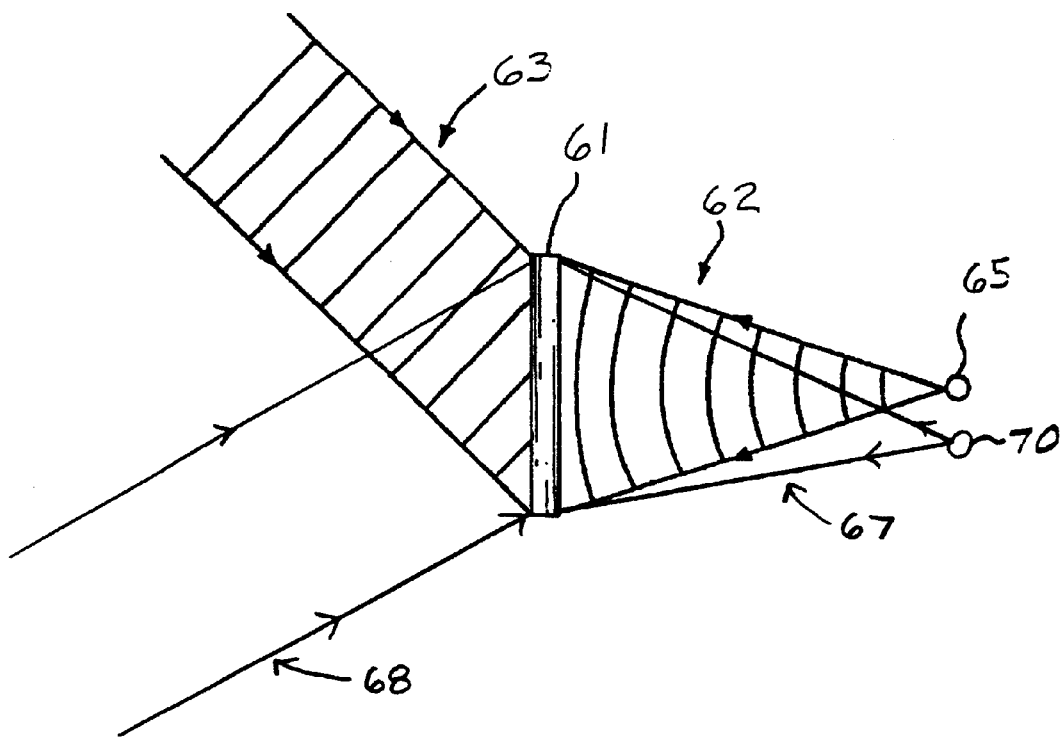
FIG. 6 is a diagram for describing how make to a component of a preferred embodiment of the invention.

FIG. 6 is a diagram for describing how to make holographic unit 4. Deposit a film emulsion 61 on an optically transparent substrate. Illuminate emulsion 61 with two mutually coherent laser beams 62 and 63, to create an interference pattern. Beam 62, generally referred to as the object beam, contains spherical wavefronts emanating from a point source 65. Beam 63, generally referred to as a collimated beam or reference beam, contains plane wavefronts. The angle between a line, from the center of emulsion 61 to point source 65, and the plane of emulsion 61, during the manufacturing process, corresponds to the angle between holographic unit 4 and detector 22 during the operation of satellite 2.

In addition, illuminate emulsion 61 with two mutually coherent laser beams 67 and 68, to create an interference pattern. Beam 67 contains spherical wavefronts emanating from a point source 70. Beam 68 contains plane wavefronts. The angle between a line, from the center of emulsion 61 to point source 70, and the plane of emulsion 61, during the manufacturing process, corresponds to the angle between holographic unit 4 and detector 24 during the operation of satellite 2.

After exposure to the beams, wash the photo-sensitive material, typically ammonium dichromate, from the emulsion and fix the film's interference pattern by chemical processing commensurate with the type of film emulsion used. In dichromated gelatin, for example, the photoexposed regions produce molecular cross-links that increase the gelatin hardness and refractive index in those regions.

Although the illustrated embodiments show holograms, residing on a common film, acting as light diffractors, the invention in its broadest sense may be practiced with other types of diffractive optical elements, such as separate holographic films stacked in layers, such as surface holograms, or binary (digital) optical elements.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A method comprising:

receiving light from a first field;

responsive to a wavelength received in the previous step, projecting from an optical assembly to a first location;

detecting light projected in the previous step;

receiving light from a second field;

responsive to the wavelength received in the previous step, projecting from the optical assembly to a second location;

detecting light projected in the previous step; and processing a result of the detecting steps, wherein the optical assembly is stationary relative to the first location.

2. The method of claim 1, wherein the optical assembly is stationary relative to the second location.

3. The method of claim 1 wherein the projecting steps are performed from a common holographic film.

4. The method of claim 1 further including sending a light signal.

5. The method of claim 4 wherein sending is performed through the optical assembly.

6. The method of claim 4 wherein sending includes sending the light signal along a path between the first location and the optical assembly.

7. The method of claim 1 wherein processing includes determining a wind profile.

8. The method of claim 1 wherein the projecting steps are performed while flying over ground.

9. A system comprising:

a first projector that projects light received from a first field to a first location;

a detector that generates electrical signal responsive to light from the first projector;

a second projector that projects light received from a second field to a second location; and a processor that receives and processes electrical signals representing light from first and second projectors, wherein the first and second projectors are stationary relative to the detector.

10. The system of claim 9, wherein the optical assembly is stationary relative to the second location.

11. The system of claim 9 wherein the first and second projects are integral in a common holographic film.

12. The system of claim 9 further including a controlled light source for illuminating the first and second fields.

13. The system of claim 12 wherein the light source is aimed to send light through the first projector.

14. The system of claim 12 wherein the light source is aimed to send light along a path between the first location and the optical assembly.

15. The system of claim 9 wherein the processor includes circuitry that determines a wind profile.

16. The system of claim 9 wherein the system is flying over ground.

17. A system comprising:

first means for receiving light from a first field;

first means responsive to a wavelength received by the first receiving means, for projecting from an optical assembly to a first location;

first means for detecting light projected by the first responsive means;

second means for receiving light from a second field;

second responsive to the wavelength received in the second receiving means, for projecting from the optical system to a second location;

second means for detecting light projected by the second responsive means; and means for processing signals from the first and second detecting means, wherein the optical assembly is stationary relative to the first and second detecting means.

* * * * *